United States Patent

[11] 3,584,949

[72] Inventor Richard G. Clow
 2018 W. Flower St., Phoenix, Ariz. 85015
[21] Appl. No. 781,182
[22] Filed Dec. 4, 1968
[45] Patented June 15, 1971

[54] OPTICAL COMPUTING APPARATUS AND METHOD
 10 Claims, 1 Drawing Fig.
[52] U.S. Cl. .................................................. 355/45,
 353/25, 353/27, 355/66
[51] Int. Cl. ..................................................... G03b 27/70,
 G03b 27/76
[50] Field of Search .......................................... 355/45, 41,
 44, 66; 353/25, 27

[56] References Cited
UNITED STATES PATENTS
3,185,026 5/1965 Carlson et al. ................. 355/45 X Primary Examiner—Samuel S. Matthews
Assistant Examiner—Richard A. Wintercorn
Attorney—Townsend and Townsend ABSTRACT: Apparatus and a method of recording optical images on a photochromic microfiche, wherein the recording is achieved with visible light to permit image positioning of extremely high accuracy. The system can be used not only to record data on a microfiche but also to correct recording errors thereon, to transfer data from one microfiche to another, and to perform computations on a microfiche where the complexity of the computation is not too great and the same operation is to be performed on a plurality of data bits recorded on the microfiche.

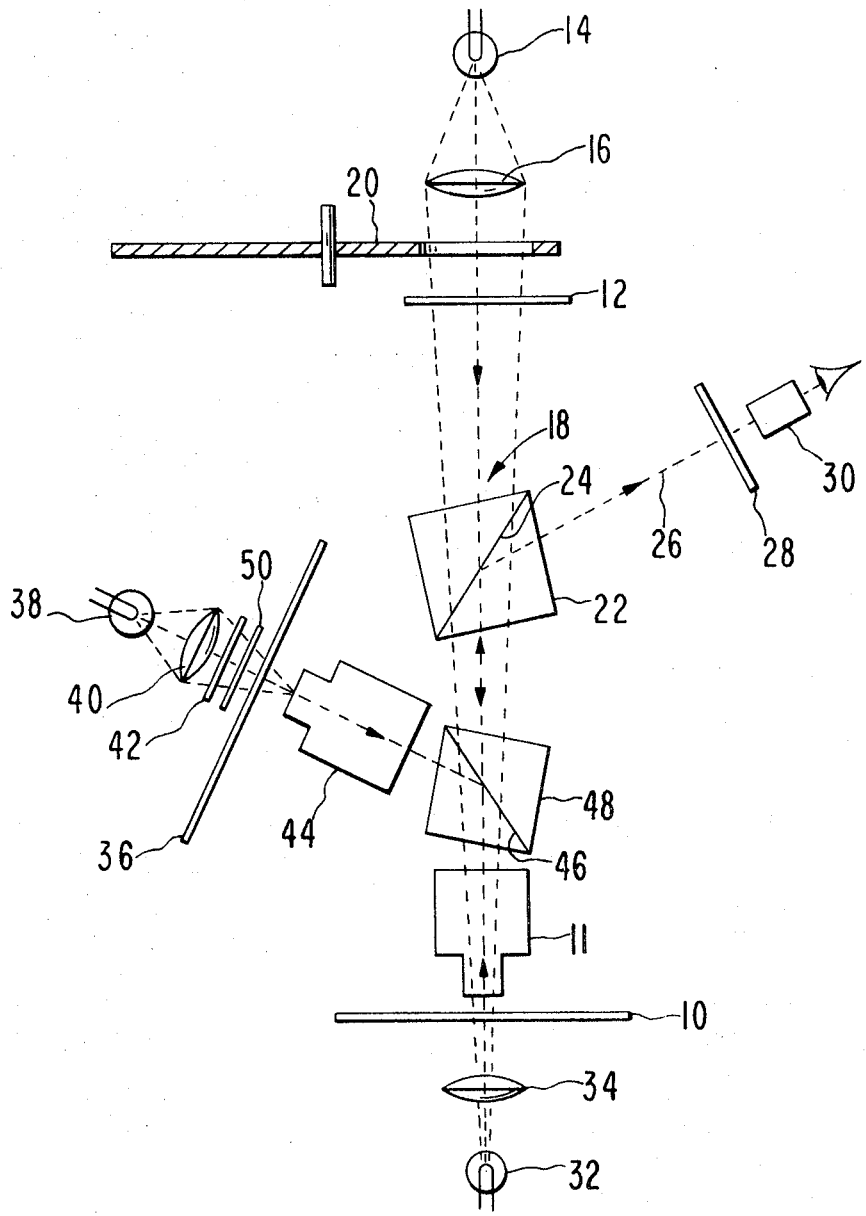

OPTICAL COMPUTING APPARATUS AND METHOD

This invention relates to improvements in optical recording techniques and, more particularly, to an apparatus and method of recording data on a photochromic microfiche.

The process of recording data on microfiche at extremely high reductions has not been entirely satisfactory because of a number of problems, one of which has been the difficulty of recording a large amount of data on the microfiche without making any errors. If photographic recording means is used, the entire microfiche must be recorded over again if any error is made. To overcome this difficulty, photochromic material has been used as the microfiche. A typical photochromic material, such as type 43-540 of American Cyanamid Company, can be darkened by ultraviolet light and rendered transparent by visible light usually of a yellow color. This photochromic material can be used to prepare a microfiche and allow corrections to be made in the microfiche in case of error.

If the original recording on the microfiche is done with ultraviolet light, corrections can be made by bleaching the portions to be corrected with yellow light. A disadvantage of this technique is that the projection to be recorded must be made with optics that are corrected for ultraviolet light. To assure that the correction is made in the proper position on the microfiche, the operator of the system must view the image to be projected as well as the image previously recorded on the microfiche. Thus, the optics must serve the dual purpose of providing a viewer for the operator in the visible spectrum, yet provide a projector for the image to be recorded in the ultraviolet spectrum. This arrangement is often difficult to achieve and resolution is usually compromised either in the viewing or in the recording optics. Also, to observe the relative locations of the image to be recorded and previously recorded image, the image to be recorded is usually projected from the rear of the microfiche and through the microfiche. Since it is difficult to produce a backing material with high optical quality, the resolution is reduced because of this requirement. In the alternative, complicated optical systems such as rotatable or the like are needed to effect this comparison.

The present invention overcome the foregoing problems by providing a system which allows both image recording and image viewing to be performed in the visual spectrum so that the optics need be corrected for visible light to thereby achieve the high accuracy in resolution. The invention provides apparatus and method utilizing a photochromic microfiche which can be predarkened for erasing purposes and can be bleached for recording purposes. Also, all of the projecting and viewing apparatus are located on one side of the microfiche to eliminate the resolution errors arising when the image is projected through the microfiche.

Another aspect of the invention is the way in which it can be used to perform general purpose computations with data recorded on a microfiche where the complexity of such computations is not too great and where the same operation is to be performed on many of the data bits of a microfiche. In most applications considered up to this time, the data have been copied from the microfiche to an information processor where data processing steps have been carried out electronically, following which a re-recording operation is necessary to return the data to the microfiche. A specific example of data processing is the reorganization of data that have already been recorded on the microfiche. If a conventional photographic microfiche is used, it is sometimes convenient to transfer its data onto a photochromic microfiche if a reordering is to be made. Thus, the use of an intermediate microfiche made of photochromic material can facilitate processing of data recorded on the microfiche.

The present invention, therefore, provides apparatus and method for making simple computations, such as relatively simple correction processes on data stored on a microfiche and when the same logical operation is to be performed on a relatively large number of bits stored on the storage microfiche. The advantage stemming from this aspect resides in the fact that, when any particular logical operation is performed on one particular bit, the same operation will be performed on all neighboring bits unless a particular effort is made to mask out only one of the bits. Since the sum, product and negation comprise all the operations of Boolean algebra and since Boolean algebra is the algebra of logic, the fact that all Boolean algebra operations can be performed is equivalent to the fact that any logical operation can be performed. Thus, a complete computing scheme can be developed with the present invention.

The primary object of this invention is to provide an optical recording apparatus and method wherein a photochromic microfiche is used for recording data in a manner which permits corrections to be readily made while providing extremely high resolutions and large size reductions.

Another object of this invention is to provide a system of the type described which can be used not only to record and correct data on a microfiche but also can be used to transfer data from one microfiche to another and to perform general purpose computations with data recorded on a microfiche.

A further object of this invention is to provide a system of the aforesaid character where the recording and viewing of the microfiche is performed on one side of the same to thereby eliminate errors in resolution due to images passing through the microfiche itself.

Other objects of this invention will become apparent as the following specification progresses, reference being had to the accompanying drawing which shows a schematic illustration of the invention.

The apparatus of this invention is shown schematically in the single drawing and includes a photochromic microfiche 10 in optical alignment with a transparency 12 on which is disposed the information to be written onto microfiche 10. The light from a light source 14 is collimated by a lens 16 so that the lightbeam 18 is focused on the lens of a microscope objective 11 to conserve light. The light from light source 14 may typically be a mercury short arc or any intense source which generates both ultraviolet light and visible light. The microfiche and transparency are mounted on suitable positioning devices to obtain the proper spatial relationships between the information or images recorded on them. A focusing adjustment may be provided as deemed necessary or desirable.

The color or wavelength of the light emanating from source 14 is controlled by a filter wheel or movable filter 20 which passes ultraviolet light, yellow light or blue light depending upon the position of the filter with respect to the optical axis of the beam.

Microfiche 10, being of photochromic material, is of the type which is darkened by ultraviolet light and is bleached by yellow light. This system operates by causing microscope objective 11 to form an image in visible light of the corresponding image on the transparency 12, thus transferring the information from the transparency to microfiche 10 by bleaching the predarkened state thereof. A suitable photochromic material for this purpose is type 43-540 made by American Cyanamid Company. This material is insensitive to blue light so that the blue light emanating from source 14 and isolated by filter wheel 20 can be used for viewing in a manner to be described.

Operator control of the placement of the projection from transparency 12 is achieved by the use of a beam splitter prism 22 which has a reflecting surface 24 at a 45° angle to the cubic surfaces of the prism. Blue light from light source 14 passes directly through prism 22 toward and onto microfiche 10 and is reflected by the microfiche back to the prism and onto reflecting surface 24 from which the light is then reflected along path 26 extending transversely of the principal optical axis of the system. The reflected light directed along path 26 passes through an ultraviolet stop filter 28 and into an eyepiece 30 at which the operator can view the position on microfiche 10 from which the blue light is reflected. Thus, the operator can see the position of the blue light beam on the microfiche as the beam emanated from source 14, whereby the operator can make any necessary adjustments to the mount for the microfiche to properly align it with respect to adjacent data positions thereon.

Blue light is chosen for operator control because this light will not essentially alter the photochromic material. This means that the photochromic material is essentially insensitive to blue light and the wavelength of this light should be approximately 440 nanometers if American Cyanamid type 43–540 photochromic material is used. The blue filter of filter 20 should be low enough in transmission characteristic so that only enough blue light passes to enable the operator to clearly see the image reflected from microfiche 10.

As to prism 22, no separation of colors in different directions results when light passes through it because the reflecting surface is at a 45° angle to the cubic surfaces of the prism. Also the prism is tilted slightly relative to the principal optical axis to prevent reflections occurring at a lower surface of the prism from source 14 from entering eyepiece 30 and forming a noisy background for the operator.

The system also includes another light source 32 behind microfiche 10 whose light beam is passed through a condensing lens 34 and then through microfiche 10 and objective 11 and is reflected by surface 24 to eyepiece 30. This feature allows the operator to see an image already recorded on microfiche 10. Light from source 32 is green light since it is necessary to use a light which is absorbed by the photochromic material of microfiche 10. The same light which is absorbed will cause a bleaching action. Hence, the intensity of the light from source 32 must be kept very low to keep the bleaching action to a minimum. Blue light cannot be used here since it is not absorbed by the activated state of the photochromic material. The color green is chosen because the eye is most sensitive to this particular color. The light should be of a wavelength of approximately 550 nanometers since the eye is most sensitive to this wavelength and the absorption of the activated photochromic material is highest at this wavelength. However, the pass band should be kept on the short side of this number, for instance, near 535 nanometers, since the maximum sensitivity of the eye shifts to shorter wavelengths at lower light levels according to the Purkinje effect. Since different operators may find slightly different colors give the greatest visibility, several green filters can be provided with the pass bands at slightly different wavelengths for this purpose.

Both of the images which are projected and viewed at eyepiece 30 are formed without passing through microfiche 10. Hence, the highest resolution can be regularly obtained without regard to the possibly poor optical qualities of the glass or film supporting the photochromic material. When the focus and position are properly adjusted, the operator uses the ultraviolet filter to darken (or erase) the photochromic film of microfiche 10. The operator uses the yellow filter to bleach (to write) on the photochromic film. He should look away from eyepiece 30 when either of these actions are taking place to avoid reducing the sensitivity of the eye which is necessary to properly align the positions of the recorded image and the image to be recorded at the lowest optical intensity.

Microfiche 10 must be in a predarkened state initially so that data on the transparency can be written on it by bleaching. Moreover, corrections can be made on the microfiche by subjecting it to ultraviolet light from source 14. To do this, the data on the transparency should be recorded as transparent portions on the opaque or dark background of the microfiche. Since the recording is to be done with visible light and the resolution is of greatest significance in the recording, the optics of the system can be corrected for visible light. This will also allow the operator to view microfiche 10 at the highest possible resolution since blue light is used and this can be done without compromising the character or quality of the optics. The system does not require as high a resolution for erasure as it does for recording. Hence, the slightly lower resolution obtainable with these optics in the ultraviolet region does not degrade the operation of the system.

Another advantage of erasing with ultraviolet light is that an almost complete erasure can be easily obtained because of the increased sensitivity of the material to ultraviolet light as compared to the bleaching action by yellow light. Various transparencies can be prepared with data which will allow them to be recorded as required on the microfiche. Various blank spaces of different sizes, for example, the size of one letter or one word or line, can be prepared which will allow convenient erasure of individual letters, words or lines. Also, a completely transparent transparency can be used to secure erasure of an entire page or field of data on the microfiche.

The system can be used to transfer information from one microfiche to another. To this end, a second microfiche 36 is located at one side of the principal optical axis and has associated therewith a light source 38 whose light beam passes through a condensing lens 40 and a diffuser 42 before it passes through microfiche 36. The light is then passed through a microscope objective 44 and onto the 45° reflecting surface 46 of a cubical beam splitter prism 48 arranged in intersecting relationship to the optical axis of the system. Light from source 38 is controlled in wavelengths by a filter 50 between diffuser 42 and microfiche 36 and the filter is chosen so that it passes either yellow light or blue light. The yellow light is used to bleach the areas of microfiche 10 and the blue light is, of course, used for viewing purposes. No erasing ultraviolet light need be provided for this portion of the system because erasure can be handled by means of transparency 12 and light source 14. If the data surface of microfiche 36 is facing microscope objective 44, no focused image need pass through the microfiche. This allows the highest resolution to be obtained.

The system can be sued to make corrections on a microfiche and, if the latter is photographic, a photochromic contact print can be made and placed at the location of microfiche 10. Individual letters can then be erased using transparency 12 and light source 14 and new data can be applied to microfiche 10 in the same way. If pages are to be interchanged on the microfiche, a photographic contact print of the microfiche can be made and placed in the position of microfiche 36. Then the pages can be recopied onto the photochromic microfiche 10.

In addition to replacing or interchanging data on the microfiche, the system can also be sued to perform simple computations of data stored on a microfiche. The data is stored in one bit per each resolution cell on the microfiche and an opaque spot represents a binary zero while a transparent spot represents a binary one. Material can be read onto the microfiche in this way from an electronic digital computer with suitable optical devices. Also, such a microfiche could be used to provide an input to an electronic digital computer having a suitable optical scanning device. Data to be interacted with the data on the microfiche is stored on the transparency in the same form except that the resolution cell is of such a size that its projected image on microfiche 10 is the same size as the resolution cell of microfiche 10.

To illustrate a simple computation, a variable P is to be added to a variable Q with one of these variables, for instance the variable P, being recorded on microfiche 10 and the other variable Q being recorded on microfiche 36. The resolution cells containing these variables are superimposed on each other by the operator. This means that the projection of the resolution cells of microfiche 36 is made to coincide with the actual data bit recorded on microfiche 10. When the projection is made with yellow light, the Boolean sum $P + Q$ is formed in the plane of microfiche 10, since this resolution cell will now be transparent if either P or Q are transparent and will be opaque only if both P and Q are opaque. The negation of all variables on a microfiche can be performed by making a negative contact print of the microfiche 10.

The Boolean product is formed by first negating all of the variables, then forming the sum of the negations and finally negating the sum. This is based on the Boolean indentity:

$$(\overline{P+Q}) = P \cdot Q$$

Other logical operations can be performed with the system. The foregoing computational process is especially useful in carrying out relatively simple correction processes on data stored on a microfiche when the same logical operation is to be performed on a fairly large block of bits in the storage microfiche.

I claim:

1. Optical recording apparatus comprising: a first, photochromic microfiche; means providing a light output having light beams of first, second and third wavelengths, said means being disposed to permit the light beams thereof to be directed along a first optical path toward and onto said microfiche, whereby an image on a transparency disposed between said microfiche and said means will be projected by one of said light beams onto said microfiche, there being means for selectively transmitting the light beams independently of each other, said microfiche being bleachable by the light beam of said first wavelength, being capable of becoming opaque when subjected to the light beam of said second wavelength, and being reflective to at least a portion of the light beam of said third wavelength; first means optically coupled with said microfiche on the same side of the latter as said light output means for directing the light reflected therefrom along a second optical path extending transversely of said first path; second means optically coupled with said microfiche for projecting an image thereon along said second path; a second microfiche; a light source capable of emitting light beams of said first and third wavelengths; and means optically coupled with said light source for selectively directing a light beam through the second microfiche and onto said first microfiche.

2. Apparatus as set forth in claim 1, wherein said transmitting means includes a filter wheel, said directing means includes a prism having a reflecting surface inclined with respect to said first path and intersecting the same.

3. Apparatus as set forth in claim 1, wherein said projecting means includes a light source disposed for directing a light beam through the first microfiche.

4. Apparatus as set forth in claim 1, wherein light of said first wavelength is yellow light, light of said second wavelength is ultraviolet light and light of said third wavelength is blue light.

5. An optical recording method comprising: providing an initially opaque, photochromic microfiche within the optical path of light output means capable of emitting visible light of a first wavelength and visible light of a second wavelength with the microfiche being bleachable by the light of the first wavelength and being reflective to at least a portion of the light of the second wavelength; placing a transparency between the light output means and the microfiche with the transparency having data thereon to be recorded and with the transparency and the microfiche being relatively shiftable to permit changes in the location of an image projected onto said microfiche from said transparency; directing light of the second wavelength through the transparency and onto the microfiche for reflection thereby; directing the reflected light from the microfiche to a viewing station to determine if an image directed onto the microfiche after it has been determined that the image is properly located thereon; providing a second microfiche; directing light of the second wavelength through the second microfiche and onto the first-mentioned microfiche, whereby light reflected from the first-mentioned microfiche can be viewed at said viewing station to determine the proper location of an image projected from the second microfiche; and directing light of said first wavelength through the second microfiche and onto the first-mentioned microfiche after the proper location of the image has been determined.

6. A method as set forth in claim 5, wherein the first-mentioned microfiche is capable of being rendered opaque by light of a third wavelength, and wherein is included the step of directing light of said third wavelength onto the first-mentioned microfiche to render the same opaque, whereby corrections can be made to a previously recorded portion thereof.

7. The method as set forth in claim 5, wherein the step of directing the reflected light includes diverting the reflected light laterally of the light path from said light output means.

8. An optical computing apparatus comprising: a first microfiche and a second microfiche; a source of visible light capable of emitting a light beam of a first wavelength and a light beam of a second wavelength, the second microfiche being formed of initially opaque, photochromic material capable of being bleached by light of the first wavelength and being reflective to at least a portion of a light beam of the second wavelength; means for selectively directing a light beam from the source, though the first microfiche and onto the second microfiche; and means for directing the reflected light from the second microfiche to a viewing station.

9. Apparatus as set forth in claim 8, wherein the photochromic material of the second microfiche is capable of becoming opaque by a light beam of a third wavelength; and means for selectively directing a light beam of a third wavelength onto the second microfiche to permit bleached portions thereof to be rendered opaque.

10. Apparatus as set forth in claim 8, wherein the first microfiche and the viewing station are disposed on one side of the second microfiche.